July 20, 1948.    M. CARTER    2,445,732
MANUFACTURE OF SPONGE RUBBER
Original Filed Dec. 19, 1940
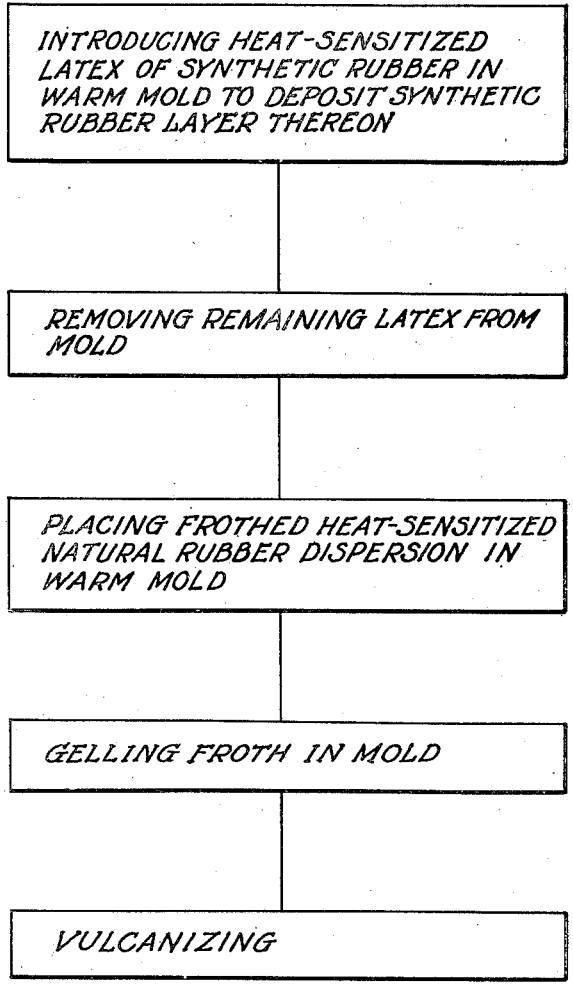
Inventor
MITCHELL CARTER
By
Ely & Frye
Attorneys Patented July 20, 1948

2,445,732

UNITED STATES PATENT OFFICE 2,445,732

MANUFACTURE OF SPONGE RUBBER

Mitchell Carter, Yardley, Pa., assignor to The Firestone Tire & Rubber Company, Akron, Ohio, a corporation of Ohio Original application December 19, 1940, Serial No. 370,791. Divided and this application June 5, 1945, Serial No. 597,663

2 Claims. (Cl. 18—53)

This invention relates to cellular, or sponge, rubber, especially to the production of cellular rubber articles and to method of manufacturing same. This application is a division of copending application Serial No. 370,791, filed December 19, 1940, now Patent Number 2,381,380.

Heretofore many various methods have been proposed by which sponge rubber articles can be made. One important method of manufacturing sponge rubber from latex involves the use of stabilizing and frothing ingredients. These substances, plus a delayed action gelling agent, are added to the latex, after which the latex is mechanically whipped or aerated to form a froth. Then it is poured into molds and after a short interval the latex froth is gelled due to the effect of the delayed action gelling agents therein. This delay occurring before the frothed latex is gelled permits some of the froth to break down before it is solidified. Hence, irregularities frequently occur in the resultant product. In some instances, the delayed action gelling agent may not function satisfactorily and it may produce gellation either during the frothing of the latex or else it may fail to set up the frothed latex until after a larger portion of the froth has broken down. The gelling of latex froth, in most cases, forms impervious skins around the resultant sponge rubber and in general is not entirely satisfactory. This is especially true in producing some specific sponge article, such as toys and other sponge articles which should have a dense, but soft, substantially imperious surface.

The single figure of the accompanying drawing is a flow diagram illustrating one species of the invention.

The general object of the present invention is to provide an improved method of forming sponge rubber, and, specifically: to provide a novel way of gelling latex froth; to provide a latex which is compounded to prevent overcure thereof; to control the cell size of frothed latex; to form a cellular rubber of greater strength than that obtained by ordinary vulcanization methods; to provide a novel method of forming rubber articles from two types of rubber; to provide an improved molding method for forming irregularly shaped articles; and to provide a method of forming rubber articles having voids in the center thereof.

The foregoing and other objects will be manifest as the specification proceeds.

In practicing the present invention, dispersions of rubber, synthetic rubber, or rubber-like substances may be used. These dispersions may be either naturally or artificially created and may have dispersed rubber particles that are either vulcanized or unvulcanized. The invention will be described with reference to natural latex.

The latex used, which preferably is concentrated to a solids content of about 57%, is frothed in any desired manner as by beating and/or aerating same in a container. Preferably, after the latex is frothed, the desired compounding ingredients are added thereto. One example of the invention comprises frothing 100 parts (dry weight) of 57% solids content latex to the desired volume and then adding a masterbatch thereto. This masterbatch comprises:

| | Parts—dry weight |
|---|---|
| "Zenite" (zinc mercaptobenzothiazole) | 1.00 |
| "Pip-Pip" (piperidinium pentamethylene dithiocarbamate) | 1.00 |
| Ethyl-zimate | .25 |
| Sulfur | 1.50 |
| Zinc oxide | 3.60 |
| Baking powder | 4.40 |
| "Stablex B" (a sulphonated naphthalene derivative) | .20 |
| Ammonium nitrate | .30 |
| Ammonia (NH₃) | 1.28 |
| Total | 13.53 |
| Water | 9.85 |

The masterbatch may be made up in bulk using, in most cases, ball mill dispersions of the dry ingredients. The Zenite, Pip-Pip, ethyl zimate and zinc oxide are ball milled with 3% of Darvan #1, while the sulfur is ball milled with 3% of Daxad #27. The ammonium nitrate and Stablex B are added to the masterbatch as 50% water solutions and the ammonia is added as a 28% solution. The baking powder which comprises, roughly, 50% sodium bicarbonate, 25% sodium aluminum sulfate, and 25% calcium acid phosphate, is stirred into the masterbatch after the ammonia is added.

After the latex has been frothed and the compounding ingredients mixed therewith, the frothed latex is poured into suitable molds to form the desired sponge rubber articles. The molds are heated to a temperature between 85° and 99° C. before the froth is poured therein. These hot molds, together with the use of ammonium nitrate in the frothed latex, cooperate to gel the latex froth before the entrained air in the cells swells to enlarge or break the cells. This gel is formed quite rapidly immediately adjacent the mold surfaces and the main bulk of latex froth is gelled within a short time thereafter, whereby the desired article is formed. Due to the rapid gellation of the surface froth, a dense but porous and smooth surface is formed on the rubber article. This surface increases the life of the resultant article and improves the appearance thereof. In this embodiment of the invention a blowing action is effected when the latex froth is placed in the hot mold whereby the froth is urged out to fill the mold completely.

Small simply formed rubber articles which are gelled hard when heated molds are used, frequently can be removed shortly after gellation occurs and subsequently be vulcanized in open steam or hot water. Hence the molds can be "turned over" much more rapidly than if the articles are vulcanized while in the mold.

Ordinarily the latex froth is vulcanized immediately after it has been gelled, which action is secured by raising the temperature to which the froth is subjected. In the example given, the latex froth is compounded in such a manner that the gellation temperature will vulcanize the latex rubber obtained. Small articles have been vulcanized by an hour to an hour and twenty-five minutes exposure to the gelling temperature.

The latex used in practice of the invention has been bulked, blended, and standardized in accordance with the disclosure in my copending application Serial No. 370,790, now abandoned, filed December 19, 1940, and has a mechanical stability of about 430, as determined in said application.

When a sponge rubber of enhanced tensile strength is desired, the latex froth should be compounded in such a manner that vulcanization will not occur at low temperatures. In that instance, vulcanizing agents that start vulcanization only at elevated temperatures should be substituted for the accelerators used in the usual practice of the invention. Only a minimum quantity of zinc oxide and accelerator should be present in the latex. Then the latex froth, after being poured into the warm molds, is placed in a vulcanizing chamber maintained at atmospheric pressure and at the highest practical temperature to dry the rubber. Of course, the temperature of the rubber will not rise above the temperature of boiling water as long as any water remains in the rubber. The pressure in the vulcanizing chamber should be such that the boiling temperature of water is not high enough to start appreciable vulcanization of the rubber. The frothed latex is exposed to such temperature and pressure for a sufficiently long time to gel the froth completely and allow communication between the cells, whereby the air in the cells is replaced by vapor. Next, the vulcanizing chamber is filled with 100% dry steam at the highest possible temperature at atmospheric pressure until the gelled froth is dry. Finally, the dried latex rubber is vulcanized by introducing steam at a temperature appreciably above 100° C. to vulcanize the rubber. The vulcanized rubber obtained will be practically dry when cooled. If desired, the rubber obtained may be washed in the usual manner. Practice of this modification of the present invention produces cellular rubber of maximum tensile strength. This process gives especially good results upon sponge rubber made without the use of soaps or other foam forming and stabilizing agents.

The latex froth may also be gelled by heating it in a steam vulcanizing chamber to 212° F. until the latex is thoroughly gelled and the cell walls are sufficiently broken that the cells intercommunicate. Then steam pressure may gradually be built up in the vulcanization chamber to vulcanize the froth rapidly. Obviously such pressure cannot be set up until the froth is thoroughly gelled and will not be collapsed thereby.

Heretofore cellular rubber articles have been formed in molds all of which were provided with some kind of a cover. In applying the cover to a mold it is almost impossible to keep from trapping air in the mold whereby the article obtained may have a rough, poorly finished surface and may not be suitable for use. It has been established that latex froth can be gelled in an open mold to produce an article of the desired shape. Preferably the mold is warmed to aid in gelling the latex froth, as pointed out hereinabove. After a rubber gel is formed, which gel may be formed by placing the mold in a vulcanizing chamber containing water vapor at about 180° to 210° F., the rubber is vulcanized by continued exposure to the water vapor or by placing the mold in open steam, hot water, or other vulcanization medium. The froth placed in the mold may swell or expand slightly before it is completely gelled and vulcanized, depending upon the temperature of the mold and/or vapor, the size of the article, amount of gelling agent used, etc., but such swelling can be readily controlled by reducing the gelling time. In all events, the exposed surface of the latex froth will be formed into smooth, uniform rubber surface of good appearance and none of the surface froth will break down before gelling.

In some cases, it may be desirable to substitute the following ingredients for the compounding and vulcanizing masterbatch listed above:

| | Per cent |
|---|---|
| Zinc oxide | .03 |
| Flowers of sulfur | 1. |
| Pip-Pip | .25 | dispersed in water containing a small percentage of Stablex B. This compound latex is particularly resistant to over cure and may be subject to vulcanizing temperatures for many extra hours without being overcured excessively. Latex compounded in this manner is especially adapted for use in forming rubber molds, which are subjected to vulcanization temperatures to vulcanize rubber contained therein, or it may be used in forming rubber articles of intricate shape which are built up from several sections, each of which is vulcanized after being placed on the article being formed.

Occasionally one may wish to increase the cell size of the latex froth before it is completely gelled, or, at least, before the froth is vulcanized. This cell enlargement may be done chemically by adding ammonia to the latex, either before or after the latex is frothed. For example, about 1% of ammonia, relative to the latex, may be added to the froth, which ammonia will be vaporized when the froth is placed into a warm mold. The ammonia gas produced rapidly expands upon heating and will enlarge the cell size in the froth before the cells are broken. Hence it causes the latex froth to swell out and fill the mold completely when the mold is initially filled with latex froth to, say, about 85% of its capacity. An additional quantity of gelling agent should be used to obtain rapid setting of the froth to retain the generated gas therein while the swelling is taking place.

In a modification of the present invention, stiff rubber articles can be produced. In this instance, latex froth is formed as described hereinabove and introduced into warm molds as in the practice of the first described method. After this frothed latex is poured into warm molds, it is allowed to stand in the molds until a cellular rubber wall of the desired thickness has been formed on the mold surface. Then the surplus latex froth is removed by any suitable method and the mold is placed in a vulcanizer for a few minutes to gel the froth completely. Or, if the mold contains sufficient heat to cause thorough gelling, the latex froth merely may be allowed to stand in the mold until completely gelled. To reenforce the cellular rubber walls formed in the molds, unaerated heat-sensitized latex is poured into the mold and allowed to stand until the desired thickness deposit thereof has been obtained on the inner surface of the cellular rubber deposit in the mold. During this operation if the heat contained in the mold is not sufficient to gel the latex rapidly, the mold should be heated in some manner to effect the coagulation or deposition of the latex on the cellular rubber. The remaining liquid latex in the mold now may be poured, or drawn, therefrom and the rubber article within the mold is vulcanized in any suitable manner. This article formed will have a sponge rubber outer surface and a solid rubber lining, whereby a stiff rubber figure formed apparently from sponge rubber, is provided. In the same manner, it is possible to form protective coatings of synthetic rubber upon sponge rubber. That is, a latex made from neoprene, Thiokol or other sun- or oil-resistant rubber-like material is made, which latex preferably is heat-sensitized, and the latex is poured into a heated mold to deposit the rubber-like material on the mold. As soon as a layer of the desired thickness is deposited, the remaining latex is drawn or poured from the mold. Substantially immediately natural latex froth is introduced into the mold and gelled to form the desired article which then is vulcanized in any suitable manner. When the synthetic rubber coating is to be placed on an article formed in an open mold, as outlined hereinabove, a coating of the synthetic can be poured, sprayed, or even brushed onto the latex froth after it has been thoroughly gelled and has been heated to a temperature sufficient to gel the synthetic latex applied thereto. In all events, the two latices must be associated before either latex has shrunk after being gelled and the water contents of the two latices must be substantially equal to give the rubber produced therefrom uniform shrinkage. Obviously the latices should be compounded to have substantially the same vulcanization characteristics.

It has been found that in filling mold cavities of intricate shape, it is desirable to fill these molds from the bottom. This is done by pressure or gravity feed, wherein latex is fed into the bottom of the mold and a slight vent is provided at the top of the mold as well as in the top of recesses in the mold which are difficult to fill in order to prevent trapping air within the mold after the latex is forced into the mold cavity. This insures filling the mold cavity completely with latex, which thereafter can be processed in accordance with standard practice.

Cellular rubber articles having large single voids in the interior thereof can be produced without the use of a core by forming froth in accordance with the invention and placing the same in a warm substantially annular mold. Next a hollow tube is inserted into the mold with the end of the tube being at the center or other desired point in the article to be vulcanized. The tube connects the interior of the mold to the atmosphere. Then the mold is placed in a vulcanization chamber and steam at the desired pressure and temperature is fed into the vulcanizer, which steam passes through the tube leading into the mold and sets up sufficient pressure within the mold to make an enlarged cavity in the center of the latex froth in the mold. This action results because the portion of the latex froth in contact with the mold, which is heated before the froth is poured therein, has gelled rapidly after its introduction into the mold. Then the liquid latex froth in the interior of the mold is forced out substantially uniformly against the gelled latex froth at the mold surfaces to increase the density and wall thickness of the cellular rubber article formed.

From the foregoing it should be apparent that a novel and improved method of forming cellular rubber is provided by the invention and that the objects of the invention have been achieved.

In the embodiments of the invention illustrated and described herein, it will be apparent that various minor changes can be made thereto without departing from the scope of the invention as defined in the appended claims.

What is claimed is:

1. That method of forming cellular rubber articles having a synthetic rubber skin thereon, comprising introducing a heat-sensitized latex of synthetic rubber into a warm mold to deposit a layer of synthetic rubber thereon, pouring the remaining latex out of the mold, placing a frothed heat-sensitized natural rubber dispersion in the warm mold, gelling the latex froth, and vulcanizing the rubber to obtain a cellular rubber article having a protective coating thereon.

2. In a method of forming cellular rubber articles having a skin of rubber-like material thereon, the steps of contacting the surface of a mold with a dispersion of a rubber-like material to deposit a layer of the material thereon, disassociating the remaining dispersion from contact with the mold, placing a frothed dispersion of a rubber-like material into contact with said layer deposited on the mold, gelling the frothed dispersion, and vulcanizing the composite article of rubber-like material.

MITCHELL CARTER.

REFERENCES CITED

The following references are of record in the file of this patent:

UNITED STATES PATENTS

| Number | Name | Date |
|---|---|---|
| 1,163,987 | Eggers | Dec. 14, 1915 |
| 1,484,731 | Malm | Feb. 26, 1924 |
| 1,896,123 | Schweitzer | Feb. 7, 1933 |
| 2,161,281 | Carter | June 6, 1939 |
| 2,208,536 | Brown | July 16, 1940 |
| 2,308,970 | Carter | Jan. 19, 1943 |
| 2,320,425 | Glaes et al. | June 1, 1943 |
| 2,345,144 | Opavsky | Mar. 28, 1944 |
| 2,381,380 | Carter | Aug. 7, 1945 |